United States Patent
Ogata

[19]

[11] Patent Number: 5,920,427
[45] Date of Patent: Jul. 6, 1999

[54] KEPLERIAN VARIABLE MAGNIFICATION FINDER

[75] Inventor: Yasuzi Ogata, Akiruno, Japan

[73] Assignee: Olympus Optical Co., Ltd., Tokyo, Japan

[21] Appl. No.: 08/609,472

[22] Filed: Mar. 1, 1996

[30] Foreign Application Priority Data

Mar. 3, 1995 [JP] Japan ................................. 7-044333

[51] Int. Cl.⁶ ........................... G02B 23/00; G02B 15/14
[52] U.S. Cl. ........................ 359/432; 359/422; 359/686
[58] Field of Search ......................... 359/362, 420–422, 359/431–433, 676–677, 683–684, 686; 396/373–386

[56] References Cited

U.S. PATENT DOCUMENTS

| | | | |
|---|---|---|---|
| 4,906,078 | 3/1990 | Inabata et al. | 396/385 |
| 5,144,349 | 9/1992 | Kato et al. | 396/385 |
| 5,144,480 | 9/1992 | Ohshita | 359/422 |
| 5,231,534 | 7/1993 | Kato | 396/385 |
| 5,257,129 | 10/1993 | Morooka et al. | 359/432 |
| 5,448,400 | 9/1995 | Kikeuchi et al. | 359/676 |
| 5,570,229 | 10/1996 | Kanamori | 359/431 |
| 5,587,400 | 12/1996 | Takase et al. | 359/431 |
| 5,757,543 | 5/1998 | Ogta | 359/432 |

FOREIGN PATENT DOCUMENTS

| | | |
|---|---|---|
| 4-219711 | 8/1992 | Japan . |
| 6-51201 | 2/1994 | Japan . |
| 6-118303 | 4/1994 | Japan . |

*Primary Examiner*—Thong Nguyen
*Attorney, Agent, or Firm*—Pillsbury Madison & Sutro LLP

[57] ABSTRACT

A Keplerian variable magnification finder includes an objective system having a positive refracting power, an image erecting system for erecting an intermediate image formed by the objective system, and an eyepiece system having a positive refracting power. The objective system is composed of a first lens unit having a negative refracting power, a second lens unit having a positive refracting power, a third lens unit having a positive refracting power, and a fourth lens unit having a negative refracting power. At least two of these four lens units are moved along the optical axis so that the magnification of the finder is changed.

10 Claims, 12 Drawing Sheets

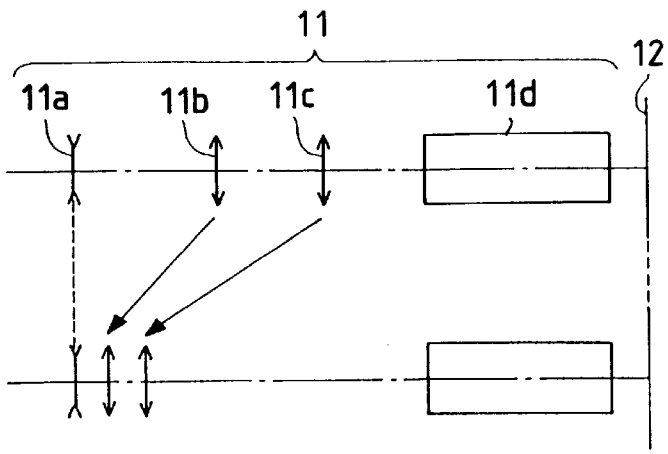
*FIG. 1A*
*PRIOR ART*
*FIG. 1B*
*PRIOR ART*
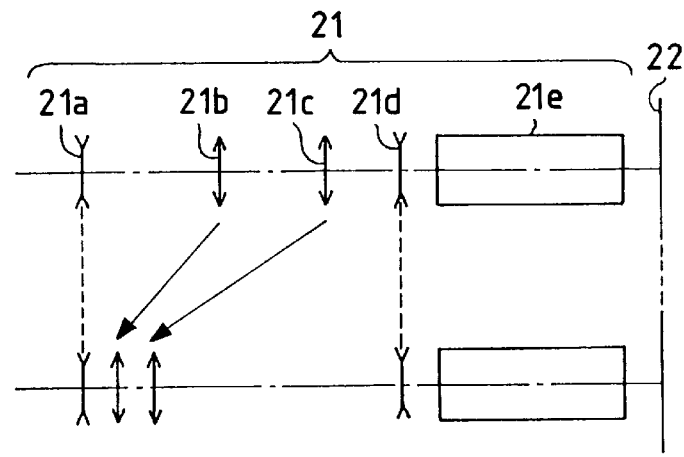
*FIG. 2A*
*FIG. 2B*
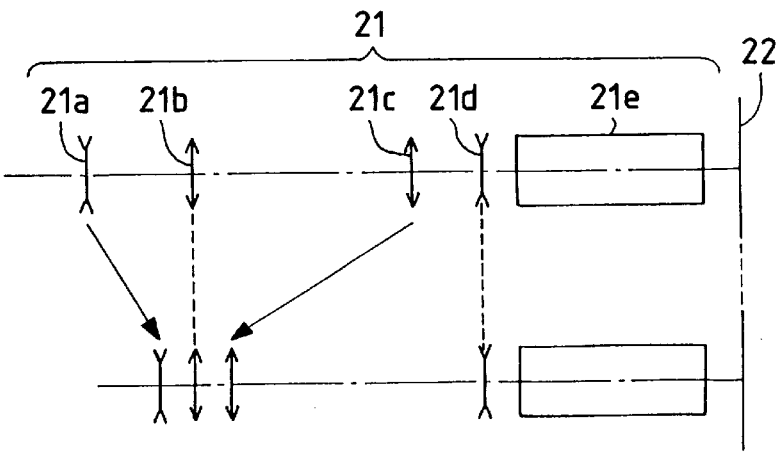
*FIG. 3A*
*FIG. 3B*

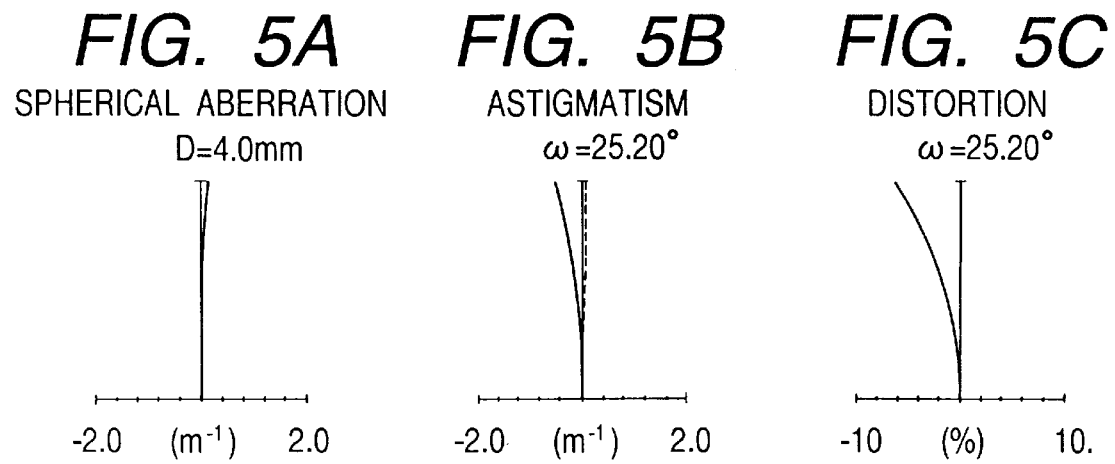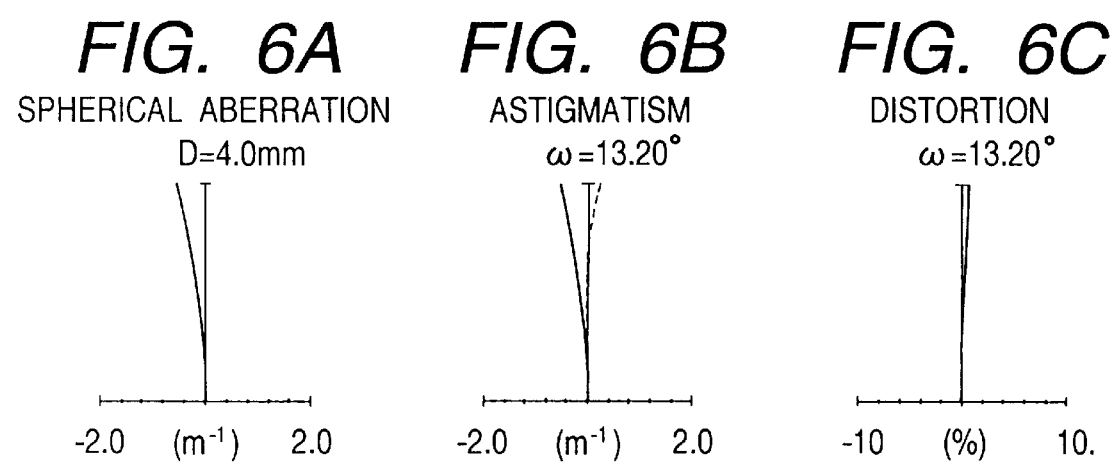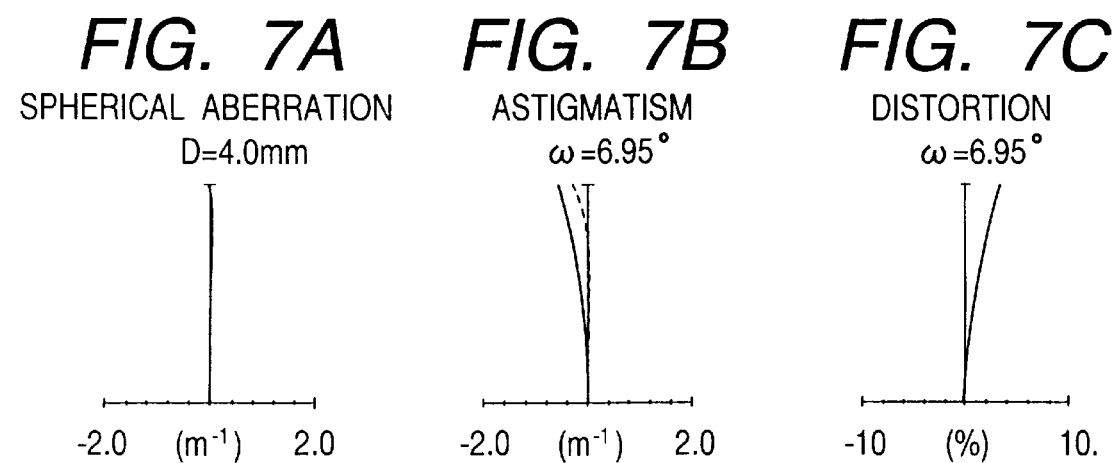

SPHERICAL ABERRATION
D=4.0mm

-2.0   (m⁻¹)   2.0

ASTIGMATISM
ω =25.20°

-2.0   (m⁻¹)   2.0

DISTORTION
ω =25.20°

-10   (%)   10.

SPHERICAL ABERRATION
D=4.0mm

-2.0   (m⁻¹)   2.0

ASTIGMATISM
ω =12.95°

-2.0   (m⁻¹)   2.0

DISTORTION
ω =12.95°

-10   (%)   10.

SPHERICAL ABERRATION
D=4.0mm

-2.0   (m⁻¹)   2.0

ASTIGMATISM
ω =6.85°

-2.0   (m⁻¹)   2.0

DISTORTION
ω =6.85°

-10   (%)   10.

SPHERICAL ABERRATION
D=4.0mm

-2.0  (m⁻¹)  2.0

ASTIGMATISM
ω=25.20°

-2.0  (m⁻¹)  2.0

DISTORTION
ω=25.20°

-10  (%)  10.

SPHERICAL ABERRATION
D=4.0mm

-2.0  (m⁻¹)  2.0

ASTIGMATISM
ω=13.10°

-2.0  (m⁻¹)  2.0

DISTORTION
ω=13.10°

-10  (%)  10.

SPHERICAL ABERRATION
D=4.0mm

-2.0  (m⁻¹)  2.0

ASTIGMATISM
ω=6.90°

-2.0  (m⁻¹)  2.0

DISTORTION
ω=6.90°

-10  (%)  10.

SPHERICAL ABERRATION
D=4.0mm

-2.0  (m⁻¹)  2.0

ASTIGMATISM
ω=25.20°

-2.0  (m⁻¹)  2.0

DISTORTION
ω=25.20°

-10  (%)  10.

SPHERICAL ABERRATION
D=4.0mm

-2.0  (m⁻¹)  2.0

ASTIGMATISM
ω=13.35°

-2.0  (m⁻¹)  2.0

DISTORTION
ω=13.35°

-10  (%)  10.

SPHERICAL ABERRATION
D=4.0mm

-2.0  (m⁻¹)  2.0

ASTIGMATISM
ω=7.00°

-2.0  (m⁻¹)  2.0

DISTORTION
ω=7.00°

-10  (%)  10.

SPHERICAL ABERRATION
D=4.0mm

-2.0  (m⁻¹)  2.0

ASTIGMATISM
ω=25.20°

-2.0  (m⁻¹)  2.0

DISTORTION
ω=25.20°

-10  (%)  10.

SPHERICAL ABERRATION
D=4.0mm

-2.0  (m⁻¹)  2.0

ASTIGMATISM
ω=13.25°

-2.0  (m⁻¹)  2.0

DISTORTION
ω=13.25°

-10  (%)  10.

SPHERICAL ABERRATION
D=4.0mm

-2.0  (m⁻¹)  2.0

ASTIGMATISM
ω=6.95°

-2.0  (m⁻¹)  2.0

DISTORTION
ω=6.95°

-10  (%)  10.

KEPLERIAN VARIABLE MAGNIFICATION FINDER

BACKGROUND OF THE INVENTION

1. Field of the Invention

This invention relates to a finder suitable for use in a lens shutter camera and the like in which a photographic lens system is provided such that it is independent of a finder lens system.

2. Description of Related Art

Keplerian finders are designed so that a field frame and additional marks are provided adjacent to the intermediate image plane of an objective system and can be observed through an ocular system. Thus, the boundary line of the frame is sharply viewed. Moreover, since a visual field itself can be clearly recognized with little flare, the view of the visual field is very fine. An entrance window, because its location is near an entrance pupil, can be designed to diminish in size, and compactness of the finder can be achieved, depending upon how each of prisms constituting an image erecting system is configured to bend an optical path. For these reasons, Keplerian finders often have been used as finders for high-grade lens shutter cameras, in particular. However, since there is the drawback that dust particles adhering to the components located close to the intermediate image plane are liable to be seen, great care must be exercised at the manufacturing stage of the finder to avoid this difficulty.

Such a Keplerian finder, compared with a conventional Albada finder, has the great advantage that the view of the visual field is favorable. On the other hand, it has the defect that because the entire system of the finder includes an objective system, an image erecting system, and an ocular system, the overall length of the finder is greater. Consequently, when such a finder is mounted in a camera, the thickness of a camera body becomes larger. With a variable magnification finder in particular, a space sufficient for moving lenses in it is required for variable magnification of the finder and consequently entire length of the objective system becomes larger. This is responsible for a further increase in the thickness of the camera body. However, in view of the latest needs of the improvement of a variable magnification ratio and the compactness of the camera, it has become an important matter to reduce the overall length of the finder.

In Keplerian finders, many objective systems which are constructed as zoom lens systems have been invented in the past, and zoom lens systems for varying the magnification of the finder are available in various types. In particular, an objective system composed of three lens units having negative, positive, and positive powers, respectively, is favorably corrected for aberrations and can be compactly designed. Thus, for such objective systems, there are numerous examples of prior art.

Keplerian variable magnification finders having the objective systems mentioned above are known which are disclosed, for example, in Japanese Patent Preliminary Publication Nos. Hei 1-131510, Hei 4-53914, Hei 4-219711, and Hei 6-51201. Any of these finders is such that the objective system is constructed with three zoom lens units with negative, positive, and positive powers so that a first lens unit is fixed and second and third lens units are moved to change the magnification and compensate for the positional shift of an image plane.

The finder disclosed in Hei 1-131510 mentioned above is constructed so that when the magnification is changed from a low magnification position to a high magnification position, the second lens unit of the objective system is moved toward an object and the third lens unit is moved toward an image. Hence, the second lens unit practically bears variable magnification behavior and the third lens unit mainly serves to compensate for the positional shift of the image plane. Four reflecting surfaces are arranged between the intermediate image plane formed by the objective system and the ocular system. As set forth in the prior art examples disclosed after this, however, an arrangement is such that as a result of the back focal distance of the objective system increasing so that reflecting surfaces for forming an erect image can be placed in the objective system, the third lens unit gradually comes to bear the variable magnification behavior and can be moved together with the second lens unit toward the object. In this case, reflecting members constituting reflecting surfaces are such that optical path lengths required vary according to how to bend optical paths. However, if the optical path length is too short, the reflecting surface cannot be constructed, while if it is too long, the entire length of the objective system will be increased. Consequently, it is required that the reflecting member is designed to provide an optimum optical path length.

A finder for effectively fulfilling this requirement is disclosed, for example, in Japanese Patent Preliminary Publication No. Hei 5-164964. This finder is such that the reflecting member is composed of a prism, the entrance surface of which is provided with a negative power to thereby control the back focal distance of the objective system.

Japanese Patent Preliminary Publication No. Hei 6-118303 discloses a finder in which a third lens unit In the objective system is constructed with a prism. This finder is such that the magnification is changed by a second lens unit in the objective system and diopter is corrected by a fourth lens unit disposed close to the intermediate image plane.

Any of the above-mentioned prior art finders, although of a low variable magnification ratio, is considerably great in the entire length of the objective system to hamper the development of compact design of the camera.

SUMMARY OF THE INVENTION

It is, therefore, an object of the present invention to provide a Keplerian variable magnification finder which bears a variable magnification ratio as high as approximately 3.5, is relatively small in overall length, and has high performance.

According to one aspect of the present invention, the Keplerian variable magnification finder includes, in order from the object side, an objective system having a positive refracting power as a whole, an image erecting system for erecting an intermediate image formed by the objective system, and an eyepiece system having a positive refracting power as a whole. The objective system is equipped with, in order from the object side, a first lens unit having a negative refracting power, a second lens unit having a positive refracting power, a third lens unit having a positive refracting power, and a fourth lens unit having a negative refracting power so that at least two of these four lens units are moved along the optical axis to change the magnification of the finder.

According to another aspect of the present invention, the KeplerLan variable magnification finder includes, in order from the object side, an objective system having a positive refracting power as a whole, an image erecting system for erecting an intermediate image formed by the objective system, and an eyepiece system having a positive refracting power as a whole. The objective system is equipped with, in order from the object side, a first lens unit having a negative refracting power, a second lens unit having a positive refracting power, a third lens unit having a positive refracting power, and a fourth lens unit having a negative refracting power so that at least two of these four lens units are moved along the optical axis to change the magnification of the finder. The objective system satisfies the following conditions at the same time:

$$0.1 < |f1/(fS\ Z)| < 0.3 \quad (1)$$

$$0.1 < f3/(fs\ Z) < 0.3 \quad (2)$$

where f1 is the focal length of the first lens unit, f3 is the focal length of the third lens unit, fS is the intermediate focal length of the objective system (fS=(fWfT)$^{1/2}$ when focal lengths of the objective system at low and high magnification positions are represented by fW and fT, respectively), and Z is a variable magnification ratio (Z=fT/fW).

According to still another aspect of the present invention, the Keplerian variable magnification finder includes, in order from the object side, an objective system having a positive refracting power as a whole, an image erecting system for erecting an intermediate image formed by the objective system, and an eyepiece system having a positive refracting power as a whole. The objective system is equipped with, in order from the object side, a first lens unit having a negative refracting power, a second Lens unit having a positive refracting power, a third lens unit having a positive refracting power, and a fourth lens unit having a negative refracting power. Any of these four lens units is composed of a single lens and at least two of the four lens units are moved along the optical axis to change the magnification of the finder. The image erecting system has four reflecting surfaces This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 1A and 1B are conceptual views for explaining arrangements, at low and high magnification positions, respectively, of an objective system of a conventional Keplerian variable magnification finder by comparison with that of the Keplerian variable magnification finder of the present invention;

FIGS. 2A and 2B are conceptual views for explaining arrangements, at low and high magnification positions, respectively, of the objective system of the Keplerian variable magnification finder according to the present invention;

FIGS. 3A and 3B are conceptual views for explaining arrangements different from those of FIGS. 2A and 2B;

FIGS. 5A, 5B, and 5C are diagrams showing characteristics of spherical aberration, astigmatism. and distortion, respectively, at the low magnification position with an infinite object point of the optical system of the first embodiment;

FIGS. 6A, 6B, and 6C are diagrams showing characteristics of spherical aberration, astigmatism. and distortion, respectively, at the moderate magnification position with the infinite object point of the optical system of the first embodiment;

FIGS. 7A, 7B, and 7C are diagrams showing characteristics of spherical aberration, astigmatism. and distortion, respectively, at the high magnification position with the infinite object point of the optical system of the first embodiment;

DETAILED DESCRIPTION OF THE PREFERRED EMBODIMENTS

Figure 4A:
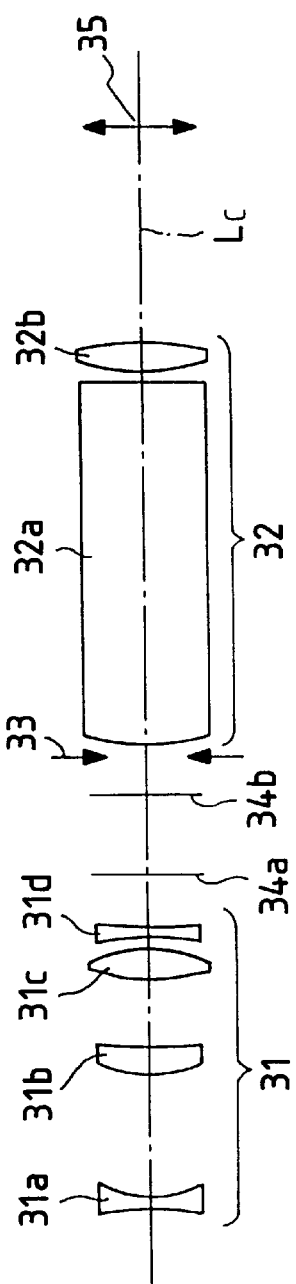
FIGS. 4A, 4B, and 4C are sectional views showing arrangements, developed along an optical axis, at low, moderate, and high magnification positions, respectively, of the optical system of a first embodiment of the Keplerian variable magnification finder according to the present invention.

Before undertaking the description of the embodiments, it will be expedient to explain the function of the Keplerian variable magnification finder according to the present invention.

In general, when a Keplerian variable magnification finder is designed, the image erecting system is configured to bend the optical path, and thus its thickness can be made small, to some extent, depending upon how the path is bent. On the other hand, this is difficult to do with the objective system because when the magnification of the finder is changed, individual lens units constituting the objective system must be moved along the optical axis. Hence, the entire length of the objective system forms a chief factor in the determination of thickness of the camera. In order to obtain a camera of small thickness, it is indispensable for the finder design that the entire length of the objective system be reduced.

Factors affecting the entire length of the objective system include (1) thicknesses of lenses of individual lens units constituting the objective system, (2) space required for moving the individual lens units, and (3) the back focal distance of the objective system. A distance from the last surface of the objective system to the intermediate image plane, namely the so-called back focal distance, always exists in an optical system, and the entire length of the objective system, including this distance, is in general determined. If, however, the back focal distance is increased to such an extent that reflecting members, such as prisms and mirrors, which form the image erecting system, are arranged in this space, the smallest possible thickness for the camera can be attained.

However, if the objective system is designed as mentioned above, the first lens unit with a negative refracting power, the second lens unit with a positive refracting power, and the third lens unit with a positive refracting power will be gathered into one block at the high magnification position. Consequently, the entire length of the objective system at the high magnification position is practically determined by its focal length, and thus it is difficult to obtain the smallest possible thickness for the camera.

The conception of the present invention will now be explained by comparison with that of a conventional example. FIGS. 1A and 1B show an objective system of three-zoom-lens-unit type with negative-positive-and-positive power in a conventional Keplerian variable magnification finder. An objective system 11 of this finder includes, in order from the object side, a first lens unit 11a with a negative refracting power, a second lens unit 11b with a positive refracting power, a third lens unit 11c with a positive refracting power, and a reflecting member 11d. Reference numeral 12 represents an intermediate image plane formed by the objective system 11. The objective system 11 is such that when the magnification of the finder is changed, the first lens unit 11a is fixed and the second and third lens units 11b and 11c are moved together toward an object not shown (the left side of the figure) along the optical axis. The reflecting member 11d is also fixed. As a result of the magnification change from a low to a high magnification position, the first to third lens units 11a–11c are gathered closest to one another into one block. Consequently, the entire length of the objective lens at the high magnification position is practically determined by the focal length of the objective system, and it is difficult to reduce the entire length of the objective system.

FIGS. 2A and 2B show arrangements of an objective system of four-zoom-lens-unit type with negative-positive-positive-and-negative power in a Keplerian variable magnification finder according to the present invention. An objective system 21 of this finder includes, in order from the object side, a first lens unit 21a having a negative refracting power, a second lens unit 21b having a positive refracting power, a third lens unit 21c having a positive refracting power, a fourth lens unit 21d having a negative refracting power, and a reflecting member 21e. Reference numeral 22 denotes an intermediate image plane formed by the objective system 21. The objective system 21 shown in FIGS. 2A and 2B is constructed so that when the magnification is changed, the first and fourth lens unit 21a and 21d are fixed. On the other hand, the objective system 21 shown in FIGS. 3A and 3B is such that when the magnification is changed, the second and fourth lens units 21b and 21d are fixed. Although, in either case, the first to third lens units 21a–21c are constructed as one block at the high magnification position, these lens units and the fourth lens unit 21d are combined into a telephoto system and thus it is possible to reduce the entire length of the objective system 21.

By using the arrangements mentioned above, the Keplerian variable magnification finder of the present invention allows the entire length of the objective system 21 to be diminished. It is also possible that the fourth lens unit 21d is constructed integral with the reflecting member 21e. In order to sufficiently reduce the entire length of the objective system 21, however, it is necessary to strengthen the negative refracting power of the fourth lens unit 21d. Hence, it is desirable that the fourth lens unit 21d is placed separate from the reflecting member 21e. Specifically, it is desirable that individual lens units constituting the objective system are arranged not to include the reflecting member. For the magnification change and compensation for the positional shift of the image plane, at least two of the individual lens units must be moved along the optical axis. In order to avoid an entire length of the objective system which is too long, it is desirable that an arrangement is such that the third lens unit can be moved.

The technique for reducing the entire length of the objective system in the finder has been explained. As an alternative way, an arrangement may be such that, in the Keplerian variable magnification finder comprising, in order from the object side, an objective system with a positive refracting power as a whole, an image erecting system for erecting an intermediate image formed by the objective system, and an eyepiece system with a positive refracting power as a whole, the objective system includes, in order from the object side, a first lens unit with a negative refracting power, a second lens unit with a positive refracting power, a third lens unit with a positive refracting power, and a fourth lens unit with a negative refracting power so that at least two of the four lens units are moved along the optical axis for the magnification change and so that Eqs. (1) and (2) previously described are simultaneously satisfied.

Eq. (1) offers a condition for making a reduction in the entire length of the objective system compatible with maintaining of its back focal distance. If the value of $|f1/(fSZ)|$ exceeds the upper limit of Eq. (1), the power of the first lens unit in the objective system will be weakened and it becomes difficult to ensure the back focal distance. If, on the other hand, the value of $|f1/(fSZ)|$ is below the lower limit of Eq. (1), the power of the first lens unit will be extremely strong and it becomes easy to ensure the back focal distance, but correction for aberration becomes difficult.

Eq. (2) provides a condition for narrowing a space required for moving the third lens unit in the objective system. In the Keplerian variable magnification finder of the present invention, the third lens unit practically bears variable magnification behavior, and hence, in order to narrow the space required for moving each lens unit when the magnification is changed. it is of the first importance that the amount of movement of the third lens unit is decreased if the value of f3/(fSZ) exceeds the upper limit of Eq. (2), the power of the third lens unit will be lessened and the amount of movement of the third lens unit for varying the magnification will be increased. If, on the other hand, the value of f3/(fSZ) is less than the lower limit of Eq. (2), the power of the third lens unit will be strengthened and the amount of movement of the third lens unit can be decreased, but correction for aberration becomes difficult.

Further, in the Keplerian variable magnification finder, each lens unit in the objective system is composed of a single lens so that the entire length of the objective system is prevented from increasing. However, if Eqs. (1) and (2) are satisfied, an increase in the entire length of the objective system can be kept to a minimum even though additional lenses are placed in the objective system so that aberration is more favorably corrected. In order to properly correct for aberration, it is desirable that the single lens constituting each lens unit includes at least one a spherical surface.

In accordance with the embodiments shown, the present invention will be explained in detail below.

First Embodiment

Figure 4B:
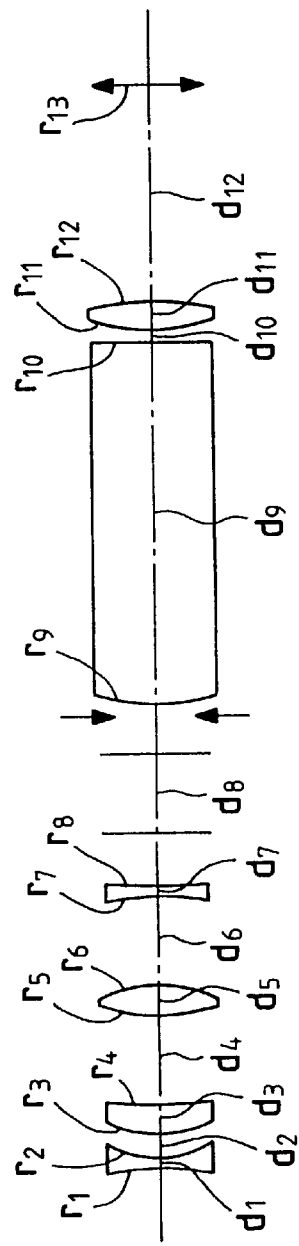
Figure 4C:
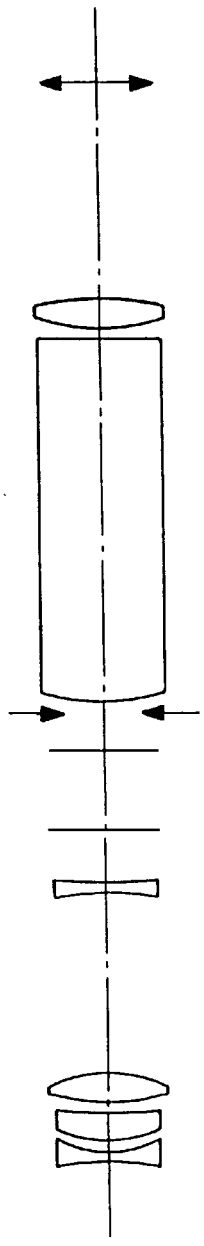

The finder of this embodiment, as shown in FIGS. 4A, 4B, and 4C, includes, in order from the object side, an objective system 31 composed of a first lens unit 31a having a negative refracting power, a second lens unit 31b having a positive refracting power, a third lens unit 31c having a positive refracting power, and a fourth lens unit 31d having a negative refracting power; and an eyepiece system 32 composed of a prism 32a as a reflecting member and an eyepiece 32b. A stop 33 is placed between the objective system 31 and the eyepiece system 32. An intermediate image plane produced by the objective system 31 is formed at the foremost surface of the prism 32a. The objective system 31 is such that when the magnification of the finder is changed, the first and fourth lens units 31a and 31d are fixed and the second and third lens units 31b and 31c are moved along an optical axis Lc. A first reflecting surface 34a and a second reflecting surface 34b are arranged between the objective system 31 and the stop 33. The prism 32a has two reflecting surfaces. The first and second reflecting surfaces 34a and 34b and the prism 32a constitute an image erecting system. The first, second, third, and fourth lens units 31a, 31b, 31c, and 31d and the eyepiece system 32b are each constructed with a single lens. Reference numeral 35 denotes an eyepoint.

In the first embodiment, since a combination of the first and second reflecting surfaces 34a and 34b forms a roof mirror and the prism 32a is constructed with a pentagonal prism, the height of the camera body can be kept to a minimum when the finder is incorporated in the camera.

The numerical data of optical members, such as lenses, constituting the Keplerian variable magnification finder of the first embodiment are shown below.

---

Finder magnification  0.4(low)~0.75(moderate)~1.40(high)
Field angle (2ω)   50.4(low)~26.4(moderate)~13.9° (high)
Focal length  $f_1 = -9.504$   $f_3 = 12.214$
           $f_W = 8.400$   $f_S = 15.716$   $f_T = 29.405$
Variable magnification ration Z  3.500
Pupil diameter D   4 mm

---

$r_1 = -24.737$
           $d_1 = 1.00$  $n_1 = 1.58423$   $v_1 = 30.49$
$r_2 = 7.266$ (aspherical)
           $d_2 = 10.192$ (low)
              1.926 (moderate),
              0.800 (high)
$r_3 = 8.476$ (aspherical)
           $d_3 = 2.50$  $n_3 = 1.49241$   $v_3 = 57.66$
$r_4 = 38.032$
           $d_4 = 5.385$ (low),
              7.323 (moderate),
              0.800 (high)
$r_5 = 11.118$ (aspherical)
           $d_5 = 2.50$  $n_5 = 1.49241$   $v_5 = 57.66$
$r_6 = -12.129$ (aspherical)
           $d_5 = 0.800$ (low),
              7.126 (moderate),
              14.776 (high)
$r_7 = -38.891$ (aspherical)
           $d_7 = 1.00$  $n_7 = 1.58423$   $v_7 = 30.49$
$r_8 = 61.741$
           $d_8 = 0.800$ (low),
              0.800 (moderate),
              0.800 (high)
$r_9 = 18.000$
           $d_9 = 43.50$  $n_9 = 1.52540$   $v_9 = 56.25$
$r_{10} = \infty$
           $d_{10} = 1.00$
$r_{11} = 18.240$ (aspherical)
           $d_{11} = 2.20$  $n_{11} = 1.49241$   $v_{11} = 57.66$
$r_{12} = -22.933$ (aspherical)
           $d_{12} = 17.00$
$r_{13}$ (eyepoint)

Conic constants and aspherical coefficients

Second surface $\kappa = 0$
$A_4 = -1.5934 \times 10^{-4}$, $A_6 = -2.5842 \times 10^{-5}$,
$A_8 = 8.3528 \times 10^{-7}$ -continued Third surface $\kappa = 0$
$A4 = -1.3784 \times 10^{-4}$, $A6 = -1.2627 \times 10^{-5}$,
$A8 = -3.2916 \times 10^{-7}$
Fifth surface $\kappa = 0$
$A4 = -3.1800 \times 10^{-4}$, $A5 = -1.6970 \times 10^{-6}$,
$A8 = -3.2463 \times 10^{-7}$
Sixth surface $\kappa = -0.1003$
$A4 = -8.4657 \times 10^{-5}$, $A6 = 1.7117 \times 10^{-6}$,
$A8 = -3.9106 \times 10^{-7}$
Seventh surface $\kappa = 0.1555$
$A4 = -3.1395 \times 10^{-4}$, $A6 = -3.3097 \times 10^{-6}$,
$A8 = -5.8231 \times 10^{-8}$
Eleventh surface $\kappa = 0$
$A4 = 1.1556 \times 10^{-4}$
Twelfth surface $\kappa = 3.5506$
$A4 = 2.2025 \times 10^{-4}$ The values of Eqs. (1) and (2) in the Keplerian variable magnification finder of the first embodiment are as follows:

$|f1/(fS\ Z)|=0.17$ $f3/(fS\ Z)=0.22$

FIGS. 5A–5C, 6A–6C, and 7A–7C are aberration curve diagrams of the optical system in the first embodiment.

Second Embodiment

Figure 8A:
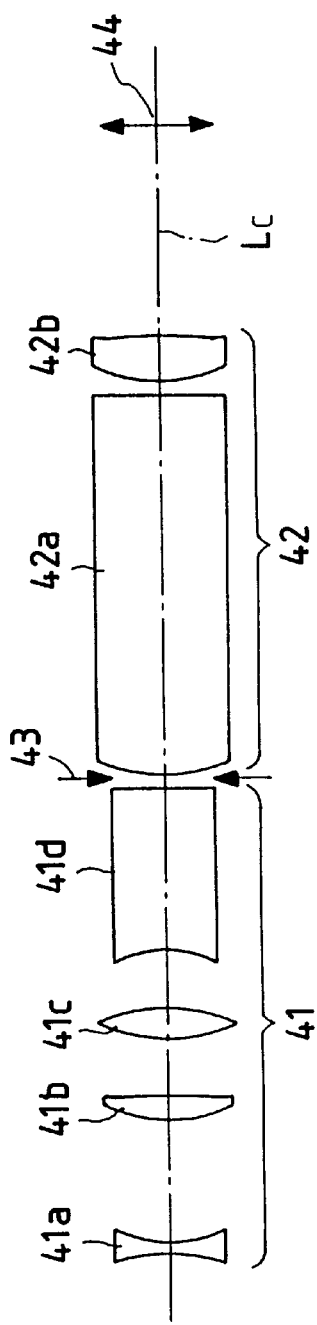
FIGS. 8A, 8B, and 8C are sectional views showing arrangements, developed along an optical axis, at low, moderate, and high magnification positions, respectively, of the optical system of a second embodiment of the Keplerian variable magnification finder according to the present invention.
Figure 8B:
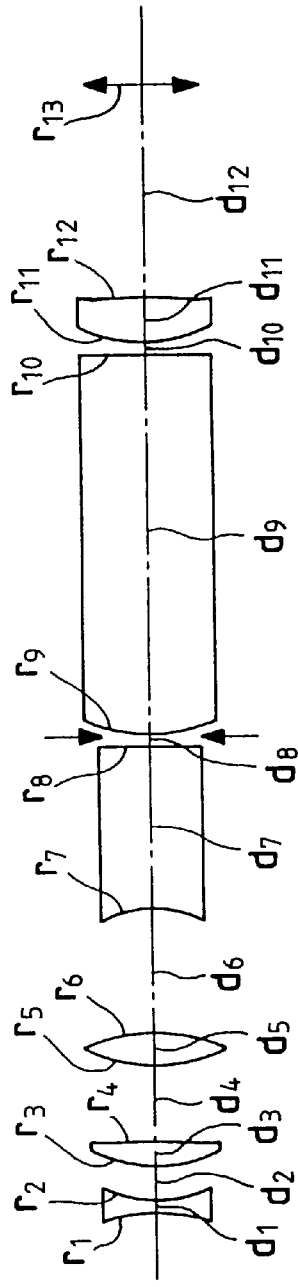
Figure 8C:
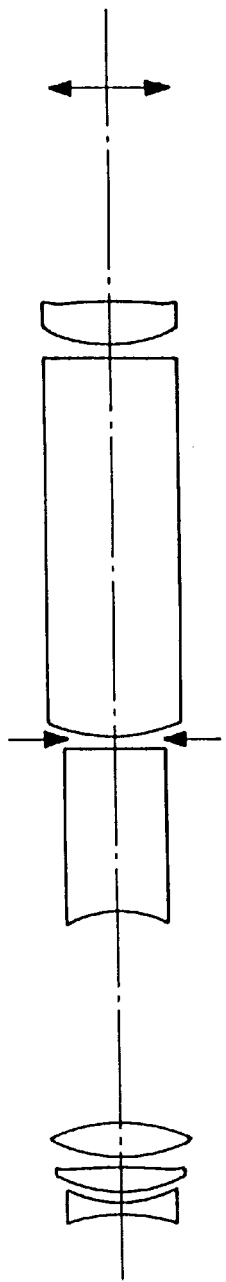
Figure 9A:
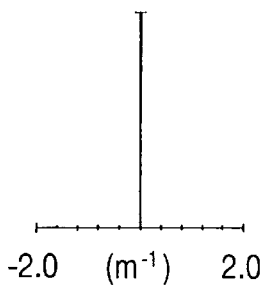
FIGS. 9A, 9B, and 9C are diagrams showing characteristics of spherical aberration, astigmatism. and distortion, respectively, at the low magnification position with the infinite object point of the optical system of the second embodiment.
Figure 9B:
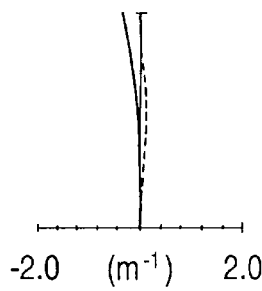
Figure 9C:
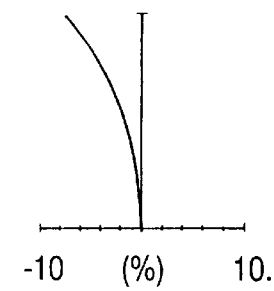
Figure 10A:
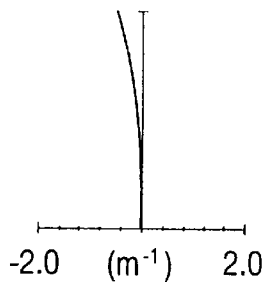
FIGS. 10A, 10B, and 10C are diagrams showing characteristics of spherical aberration, astigmatism. and distortion, respectively, at the moderate magnification position with the infinite object point of the optical system of the second embodiment.
Figure 10B:
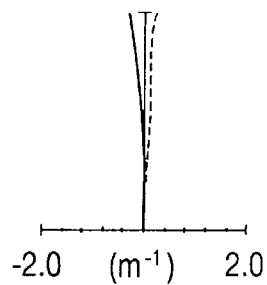
Figure 10C:
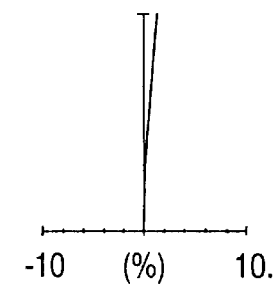
Figure 11A:
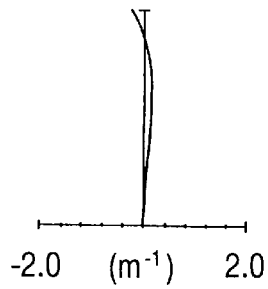
Figs. 11A, 11B, and 11C are diagrams showing characteristics of spherical aberration, astigmatism. and distortion, respectively, at the high magnification position with the infinite object point of the optical system of the second embodiment.
Figure 11B:
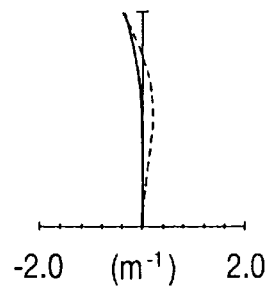
Figure 11C:
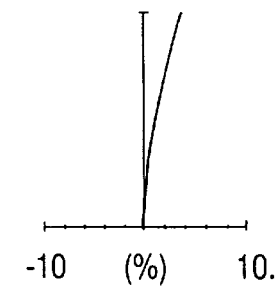

The finder of this embodiment, as shown in FIGS. 8A, 8B, and 8C, includes, in order from the object side, an objective system 41 composed of a first lens unit 41a having a negative refracting power, a second lens unit 41b having a positive refracting power, a third lens unit 41c having a positive refracting power, and a fourth lens unit 41d having a negative refracting power, constructed with a roof prism having two reflecting surfaces; and an eyepiece system 42 composed of a prism 42a as a reflecting member and an eyepiece 42b. A stop 43 is placed between the objective system 41 and the eyepiece system 42. An intermediate image plane produced by the objective system 41 is formed at the foremost surface of the prism 42a. The objective system 41 is such that when the magnification is changed, the first and fourth lens units 41a and 41d are fixed and the second and third lens units 41b and 41c are moved along the optical axis Lc. The prism 42a has two reflecting surfaces and constitutes an image erecting system together with the fourth lens unit 41d. The first, second, and third lens units 41a, 41b, and 41c and eyepiece system 42b are each constructed with a single lens. Reference numeral 44 denotes an eyepoint. In the second embodiment, the prism 42a is composed of a pentagonal prism.

The numerical data of optical members, such as lenses, constituting the Keplerian variable magnification finder of the second embodiment are shown below.

Finder magnification  0.40(low)~0.75(moderate)~1.40 (high)
Field angle (2ω)      50.4(low)~25.9(moderate)~13.7° (high)
Focal length $f_1 = -8.378$    $f_3 = 12.202$
         $f_W = 8.401$   $f_S = 15.715$   $f_T = 29.397$
Variable magnification ration Z  3.500
Pupil diameter D  4 mm $r_1 = -13.899$
            $d_1 = 1.00$   $n_1 = 1.58423$   $\nu_1 = 30.49$
$r_2 = 7.756$ (aspherical)
            $d_2 = 9.827$ (low),
                 2.805 (moderate),
                 0.800 (high)
$r_3 = 10.337$
            $d_3 = 2.00$   $n_3 = 1.49241$   $\nu_3 = 57.66$
$r_4 = -43.636$ (aspherical)
            $d_4 = 4.319$ (low),
                 6.012 (moderate),
                 0.800 (high)
$r_5 = 10.203$ (aspherical)
            $d_5 = 2.60$   $n_5 = 1.49241$   $\nu_5 = 57.66$
$r_6 = -13.386$
            $d_6 = 4.467$ (low),
                 9.795 (moderate),
                 17.014 (high)
$r_7 = -8.642$ (aspherical)
            $d_7 = 13.00$  $n_7 = 1.52540$   $\nu_7 = 56.25$
$r_8 = \infty$
            $d_8 = 1.00$
$r_9 = 13.746$
            $d_9 = 29.50$  $n_9 = 1.52540$   $\nu_9 = 56.25$
$r_{10} = \infty$
            $d_{10} = 1.00$
$r_{11} = 13.954$ (aspherical)
            $d_{11} = 3.50$  $n_{11} = 1.49241$   $\nu_{11} = 57.66$
$r_{12} = -36.629$ (aspherical)
            $d_{12} = 17.00$
$r_{13}$ (eyepoint)

Conic constants and aspherical coefficients

Second surface $\kappa = 0$
$A4 = -4.0966 \times 10^{-4}$, $A6 = -7.0073 \times 10^{-6}$,
$A8 = -9.6883 \times 10^{-8}$
Fourth surface $\kappa = 5.8567$
$A4 = 1.1218 \times 10^{-4}$, $A6 = 2.8756 \times 10^{-6}$,
$A8 = 1.4969 \times 10^{-7}$
Fifth surface $\kappa = 0$
$A4 = -3.2893 \times 10^{-4}$, $A6 = -5.1321 \times 10^{-7}$,
$A8 = -1.6715 \times 10^{-8}$
Seventh surface $\kappa = 1.9537$
$A4 = -1.2601 \times 10^{-5}$, $A6 = 2.8742 \times 10^{-5}$
Eleventh surface $\kappa = 0.2952$
$A4 = 1.4628 \times 10^{-4}$, $A6 = 5.1635 \times 10^{-6}$
Twelfth surface $\kappa = 3.4032$
$A4 = 2.7379 \times 10^{-4}$, $A6 = 6.8191 \times 10^{-6}$ The values of Eqs. (1) and (2) in the Keplerian variable magnification finder of the second embodiment are as follows:

$|f1/(fS\ Z)|=0.15$ $f3/(fS\ Z)=0.22$

FIGS. 9A–9C, 10A–10C, and 11A–11C are aberration curve diagrams of the optical system in the second embodiment.

Third Embodiment

Figure 12A:
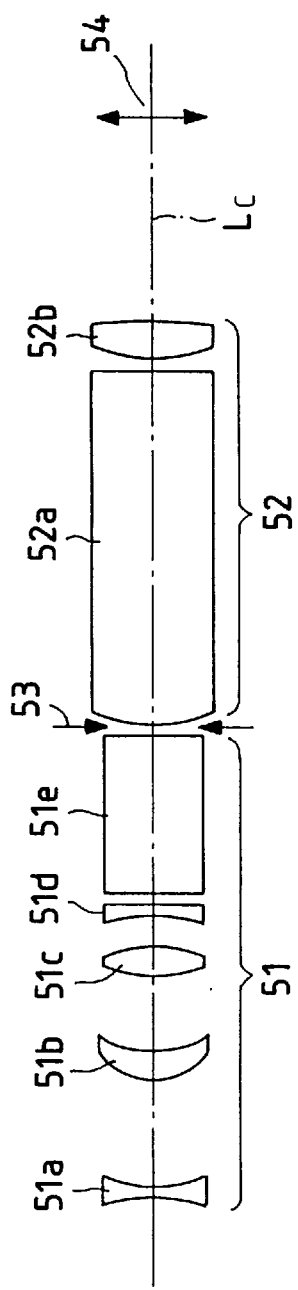
FIGS. 12A, 12B, and 12C are sectional views showing arrangements, developed along an optical axis, at low, moderate, and high magnification positions, respectively, of the optical system of a third embodiment of the Keplerian variable magnification finder according to the present invention.
Figure 12B:
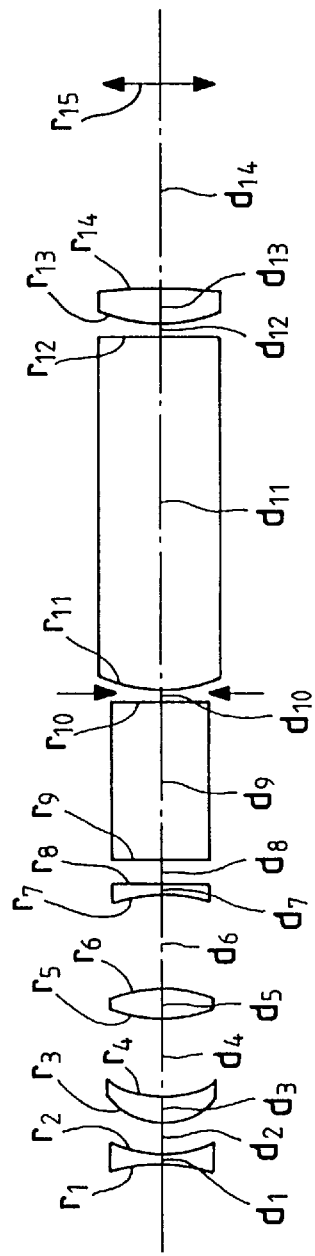
Figure 12C:
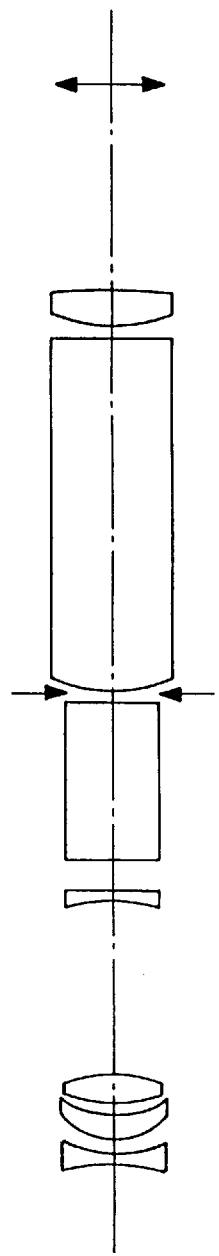
Figure 13A:
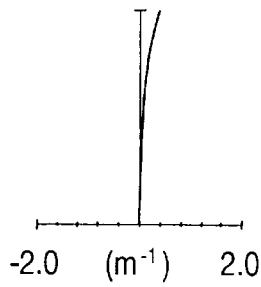
FIGS. 13A, 13B, and 13C are diagrams showing characteristics of spherical aberration, astigmatism. and distortion, respectively, at the low magnification position with the infinite object point of the optical system of the third embodiment.
Figure 13B:
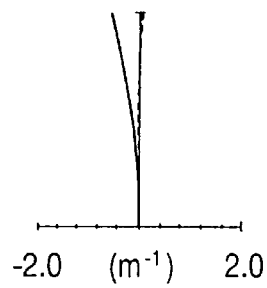
Figure 13C:
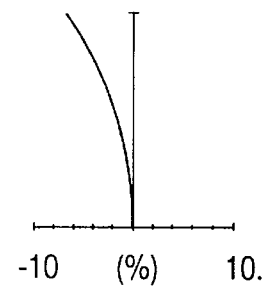
Figure 14A:
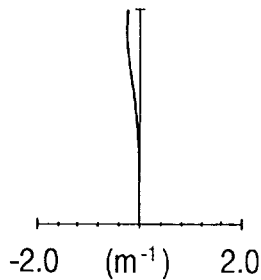
FIGS. 14A, 14B, and 14C are diagrams showing characteristics of spherical aberration, astigmatism. and distortion, respectively, at the moderate magnification position with the infinite object point of the optical system of the third embodiment.
Figure 14B:
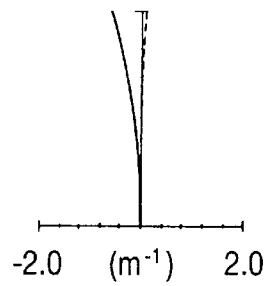
Figure 14C:
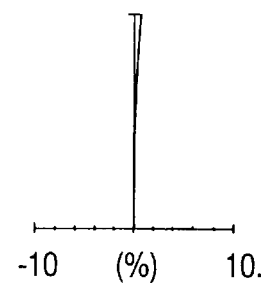
Figure 15A:
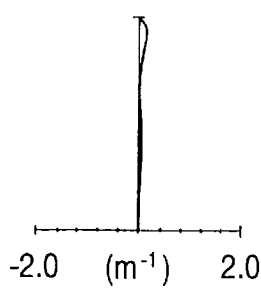
FIGS. 15A, 15B, and 15C are diagrams showing characteristics of spherical aberration, astigmatism. and distortion, respectively, at the high magnification position with the infinite object point of the optical system of the third embodiment.
Figure 15B:
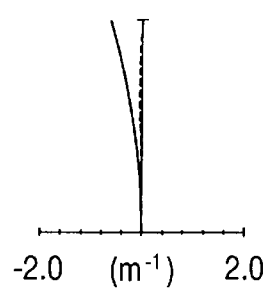
Figure 15C:
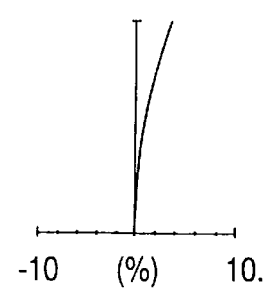

The finder of this embodiment, as shown in FIGS. 12A, 12B, and 12C, includes, in order from the object side, an objective system 51 composed of a first lens unit 51a having a negative refracting power, a second lens unit 51b having a positive refracting power, a third lens unit 51c having a positive refracting power, a fourth lens unit 51d having a negative refracting power, and a prism 51e as a reflecting member; and an eyepiece system 52 composed of a prism 52a as a reflecting member and an eyepiece 52b. A stop 53 is placed between the objective system 51 and the eyepiece system 52. An intermediate image plane produced by the objective system 51 is formed at the foremost surface of the prism 52a. The objective system 51 is such that when the magnification is changed, the first lens unit 51a is fixed and the second, third, and fourth lens units 51b, 51c, and 51d are moved along the optical axis Lc. The prisms 51e and 52a each have two reflecting surfaces and constitute an image erecting system. The first, second, third, and fourth lens units 51a, 51b, 51c, and 51d and the eyepiece system 52b are each constructed with a single lens. Reference numeral 54 denotes an eyepoint.

In the third embodiment, since the prism 51e includes a roof mirror and the prism 52a is constructed with a pentagonal prism, the height of the camera body can be kept to a minimum when the finder is incorporated in the camera.

The numerical data of optical members, such as lenses, constituting the Keplerian variable magnification finder of the third embodiment are shown below.

| | |
|---|---|
| Finder magnification | 0.40(low)~0.75(moderate)~1.40(high) |
| Field angle (2ω) | 50.4(low)~26.2(moderate)~13.8°(high) |
| Focal length $f_1 = -8.334$ | $f_3 = 11.887$ |
| $f_W = 8.401$ | $f_S = 15.714$  $f_T = 29.394$ |
| Variable magnification ration Z | 3.500 |
| Pupil diameter D | 4 mm |

$r_1 = -13.509$
  $d_1 = 1.00$  $n_1 = 1.58423$  $v_1 = 30.49$
$r_2 = 7.820$ (aspherical)
  $d_2 = 9.112$ (low),
  2.438 (moderate),
  0.800 (high)
$r_3 = 5.553$
  $d_3 = 2.50$  $n_3 = 1.49241$  $v_3 = 57.66$
$r_4 = 18.121$ (aspherical)
  $d_4 = 6.151$ (low),
  6.494 (moderate),
  0.800 (high)
$r_5 = 10.154$ (aspherical)
  $d_5 = 2.50$  $n_5 = 1.49241$  $v_5 = 57.66$
$r_6 = -12.697$
  $d_6 = 2.534$ (low),
  7.772 (moderate),
  14.443 (high)
$r_7 = -13.158$ (aspherical)
  $d_7 = 1.00$  $n_7 = 1.58423$  $v_7 = 30.49$
$r_8 = -298.710$
  $d_8 = 0.800$ (low),
  1.894 (moderate),
  2.556 (high)
$r_9 = \infty$
  $d_9 = 13.00$  $n_9 = 1.52540$  $v_9 = 56.25$
$r_{10} = \infty$
  $d_{10} = 1.00$
$r_{11} = 11.788$
  $d_{11} = 29.50$  $n_{11} = 1.52540$  $v_{11} = 56.25$
$r_{12} = \infty$
  $d_{12} = 1.10$
$r_{13} = 13.977$
  $d_{13} = 3.00$  $n_{13} = 1.49241$  $v_{13} = 57.66$
$r_{14} = -36.939$ (aspherical)

$d_{14} = 17.00$
$r_{15}$ (eyepoint)

Conic constants and aspherical coefficients

Second surface $\kappa = 0$
$A4 = -4.7304 \times 10^{-4}, A6 = -1.5521 \times 10^{-5},$
$A8 = -4.7525 \times 10^{-7}$
Fourth surface $\kappa = 0$
$A4 = 1.1895 \times 10^{-3}, A6 = 3.8376 \times 10^{-5},$
$A8 = 1.0896 \times 10^{-6}$
Fifth surface $\kappa = 0$
$A4 = -3.3274 \times 10^{-4}, A6 = 2.9550 \times 10^{-6},$
$A8 = -2.5211 \times 10^{-7}$
Seventh surface $\kappa = 0.4227$
$A4 = -1.6225 \times 10^{-4}, A6 = -6.9102 \times 10^{-6},$
$A8 = 4.2265 \times 10^{-7}$
Fourteenth surface $\kappa = 8.8576$
$A4 = 1.0586 \times 10^{-4}, A6 = -6.8625 \times 10^{-8},$
$A8 = 8.7465 \times 10^{-9}$ The values of Eqs. (1) and (2) in the Keplerian variable magnification finder of the third embodiment are as follows:

$$|f1/(fS\ Z)|=0.15$$

$$f3/(fS\ Z)=0.22$$

FIGS. 13A–13C, 14A–14C, and 15A–15C are aberration curve diagrams of the optical system in the third embodiment.

Fourth Embodiment

Figure 16A:
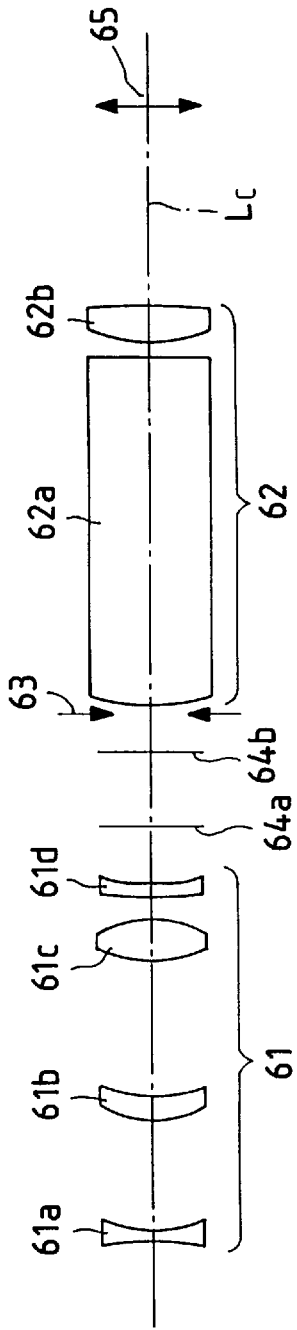
FIGS. 16A, 16B, and 16C are sectional views showing arrangements, developed along an optical axis, at low, moderate, and high magnification positions, respectively, of the optical system of a fourth embodiment of the Keplerian variable magnification finder according to the present invention.
Figure 16B:
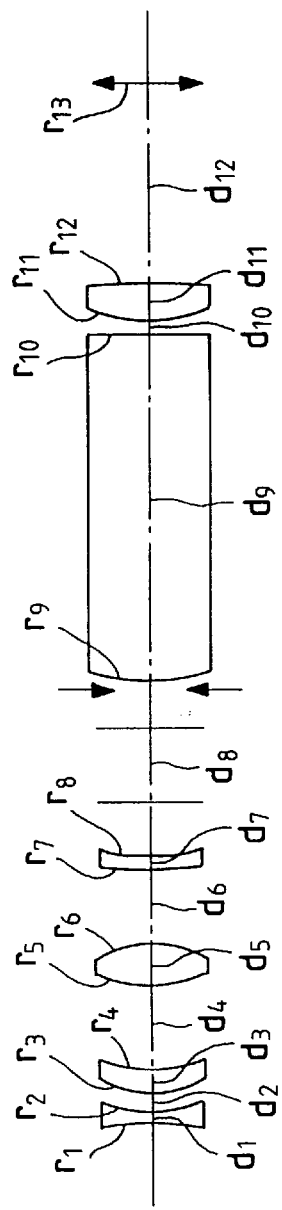
Figure 16C:
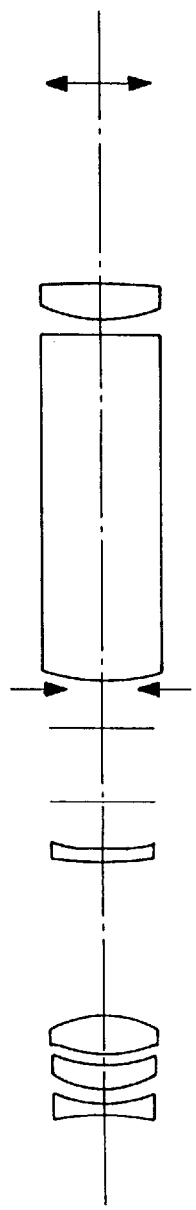
Figure 17A:
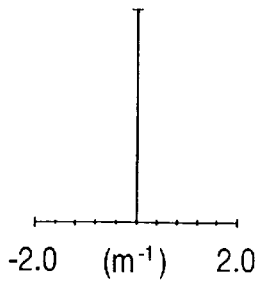
FIGS. 17A, 17B, and 17C are diagrams showing characteristics of spherical aberration, astigmatism. and distortion, respectively, at the low magnification position with the infinite object point of the optical system of the fourth embodiment.
Figure 17B:
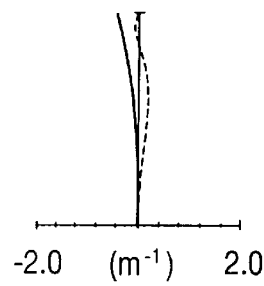
Figure 17C:
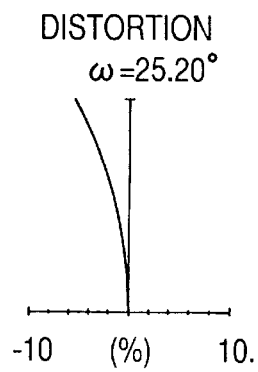
Figure 18A:
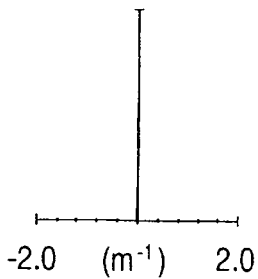
FIGS. 18A, 18B, and 18C are diagrams showing characteristics of spherical aberration, astigmatism. and distortion, respectively, at the moderate magnification position with the infinite object point of the optical system of the fourth embodiment.
Figure 18B:
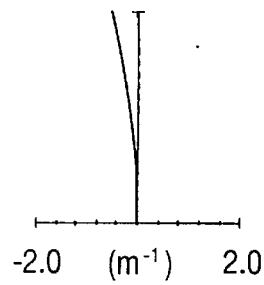
Figure 18C:
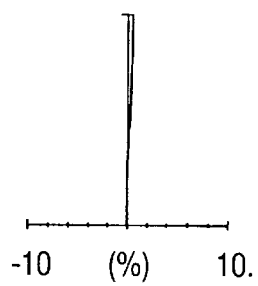
Figure 19A:
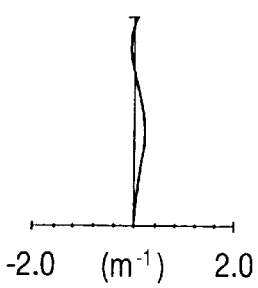
FIGS. 19A, 19B, and 19C are diagrams showing characteristics of spherical aberration, astigmatism. and distortion, respectively, at the high magnification position with the infinite object point of the optical system of the fourth embodiment.
Figure 19B:
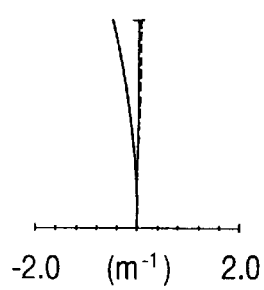
Figure 19C:
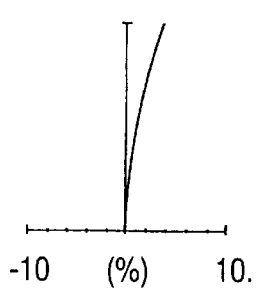

The finder of this embodiment, as shown in FIGS. 16A, 16B, and 16C, includes, in order from the object side, an objective system 61 composed of a first lens unit 61a having a negative refracting power, a second lens unit 61b having a positive refracting power, a third lens unit 61c having a positive refracting power, and a fourth lens unit 61d having a negative refracting power; and an eyepiece system 62 composed of a prism 62a as a reflecting member and an eyepiece 62b. A stop 63 is placed between the objective system 61 and the eyepiece system 62. An intermediate image plane produced by the objective system 61 is formed at the foremost surface of the prism 62a. The objective system 61 is such that when the magnification is changed, the second lens unit 61b is fixed and the first, third, and fourth lens units 61a, 61c and 61d are moved along the optical axis Lc. Further, a first reflecting surface 64a and a second reflecting surface 64b are arranged between the objective system 61 and the stop 63. The prism 62a has two reflecting surfaces. The first and second reflecting surfaces 64a and 64b and the prism 62a constitute an image erecting system. The first, second, third, and fourth lens units 61a, 61b, 61c, and 61d and the eyepiece system 62b are each constructed with a single lens. Reference numeral 65 denotes an eyepoint.

In the fourth embodiment, the first lens unit 61a is shifted forward as the magnification is decreased from the highest value, and thus the entire length of the objective system is maximized at the low magnification position. Since a combination of the first and second reflecting surfaces 64a and 64b forms a roof mirror and the prism 62a is constructed with a pentagonal prism, the height of the camera body can be kept to a minimum when the finder is incorporated in the camera.

The numerical data of optical members, such as lenses, constituting the Keplerian variable magnification finder of the fourth embodiment are shown below.

| Finder magnification | 0.40(low)~0.75(moderate)~1.40(high) | | |
|---|---|---|---|
| Field angle (2ω) | 50.4(low)~26.7(moderate)~14.0°(high) | | |
| Focal length $f_1 = -10.627$ | $f_3 = 10.393$ | | |
| $f_W = 8.402$ | $f_S = 15.717$ | $f_T = 29.402$ | |
| Variable magnification ration Z | 3.500 | | |
| Pupil diameter D | 4 mm | | |

$r_1 = -37.816$ (aspherical)
 $d_1 = 1.00$   $n_1 = 1.58423$   $\nu_1 = 30.49$
$r_2 = 7.501$ (aspherical)
 $d_2 = 9.150$ (low),
  1.551 (moderate),
  1.146 (high)
$r_3 = 7.185$ (aspherical)
 $d_3 = 2.00$   $n_3 = 1.49241$   $\nu_3 = 57.66$
$r_4 = 10.620$ (aspherical)
 $d_4 = 11.569$ (low),
  7.209 (moderate),
  0.800 (high)
$r_5 = 9.398$ (aspherical)
 $d_5 = 3.50$   $n_5 = 1.49241$   $\nu_5 = 57.66$
$r_6 = -9.856$ (aspherical)
 $d_6 = 1.891$ (low),
  6.336 (moderate),
  13.034 (high)
$r_7 = -14.851$ (aspherical)
 $d_7 = 1.00$   $n_7 = 1.58423$   $\nu_7 = 30.49$
$r_8 = -186.514$ (aspherical)
 $d_8 = 1.173$ (low),
  1.087 (moderate),
  0.800 (high)
$r_9 = 16.967$
 $d_9 = 43.50$   $n_9 = 1.52540$   $\nu_9 = 56.25$
$r_{10} = \infty$
 $d_{10} = 1.10$
$r_{11} = 13.652$ (aspherical)
 $d_{11} = 3.20$   $n_{11} = 1.49241$   $\nu_{11} = 57.66$
$r_{12} = -39.351$ (aspherical)
 $d_{12} = 17.00$
$r_{13}$ (eyepoint)

Conic constants and aspherical coefficients

First surface $\kappa = 0.2339$
$A4 = -1.9933 \times 10^{-3}$, $A6 = 9.7617 \times 10^{-5}$,
$A8 = -1.9922 \times 10^{-6}$
Second surface $\kappa = 0$
$A4 = -2.7404 \times 10^{-3}$, $A6 = 7.6562 \times 10^{-5}$,
$A8 = -9.7549 \times 10^{-7}$
Third surface $\kappa = 0$
$A4 = -8.0425 \times 10^{-4}$, $A6 = 1.7594 \times 10^{-5}$,
$A8 = -8.3190 \times 10^{-7}$
Fourth surface $\kappa = 0$
$A4 = -2.1463 \times 10^{-4}$, $A6 = 3.3915 \times 10^{-5}$,
$A8 = -1.3076 \times 10^{-6}$
Fifth surface $\kappa = 0$
$A4 = -4.3550 \times 10^{-4}$, $A6 = -7.0628 \times 10^{-6}$,
$A8 = -2.9479 \times 10^{-7}$ -continued Sixth surface $\kappa = 0$
$A4 = 1.9541 \times 10^{-4}$, $A6 = -8.0156 \times 10^{-6}$,
$A8 = -2.5207 \times 10^{-7}$
Seventh surface $\kappa = 0.1972$
$A4 = 3.4520 \times 10^{-3}$, $A6 = -1.1239 \times 10^{-4}$,
$A8 = 1.5355 \times 10^{-6}$
Eighth surface $\kappa = -1.2733$
$A4 = 3.4548 \times 10^{-3}$, $A6 = -7.2157 \times 10^{-5}$,
Eleventh surface $\kappa = 0$
$A4 = 9.1294 \times 10^{-5}$
Twelfth surface $\kappa = 0.4574$
$A4 = 1.8203 \times 10^{-4}$ The values of Eqs. (1) and (2) in the Keplerian variable magnification finder of the fourth embodiment are as follows:

$|f1/(fS\ Z)|=0.19$ $f3/(fS\ Z)=0.19$

FIGS. 17A–17C, 18A–18C, and 19A–19C are aberration curve diagrams of the optical system in the fourth embodiment.

Fifth Embodiment

Figure 20A:
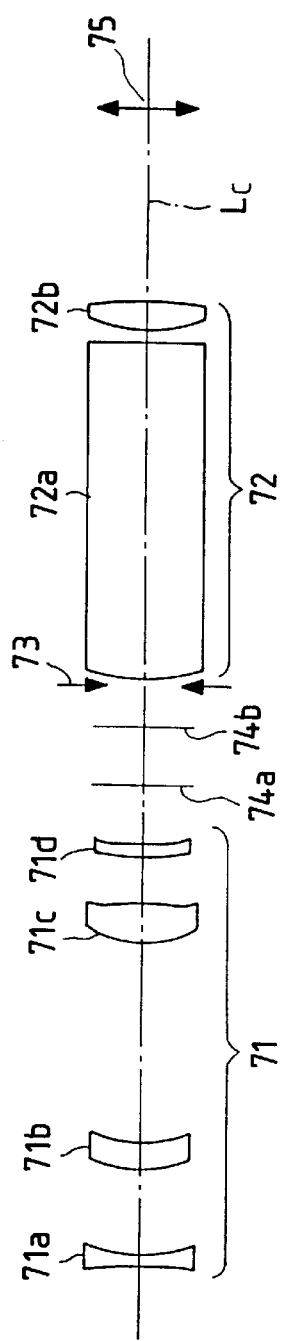
FIGS. 20A, 20B, and 20C are sectional views showing arrangements, developed along an optical axis, at low, moderate, and high magnification positions, respectively, of the optical system of a fifth embodiment of the Keplerian variable magnification finder according to the present invention.
Figure 20B:
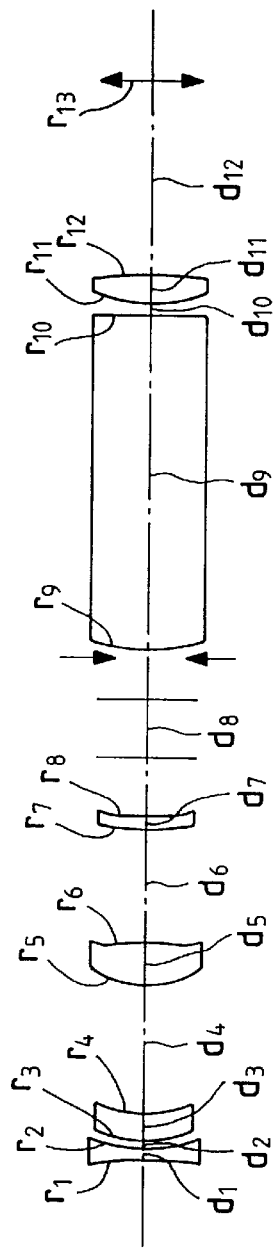
Figure 20C:
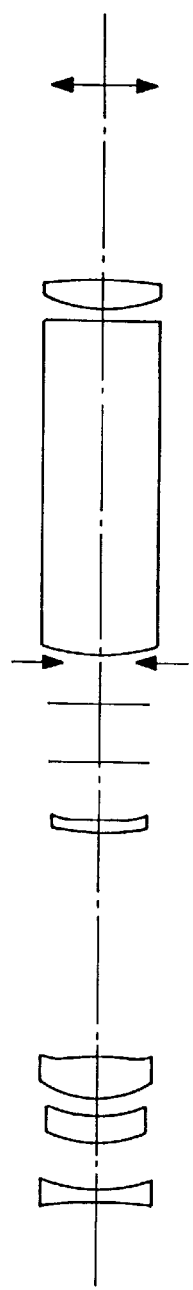
Figure 21A:
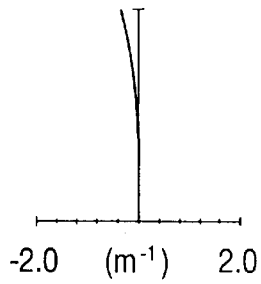
FIGS. 21A, 21B, and 21C are diagrams showing characteristics of spherical aberration, astigmatism. and distortion, respectively, at the low magnification position with the infinite object point of the optical system of the fifth embodiment.
Figure 21B:
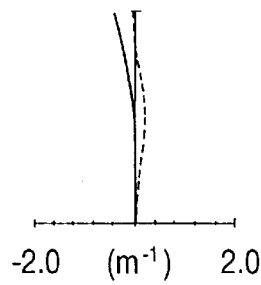
Figure 21C:
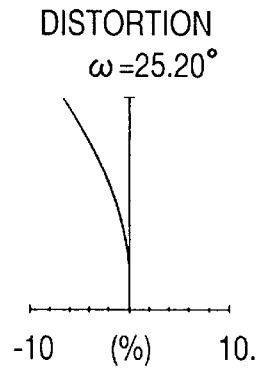
Figure 22A:
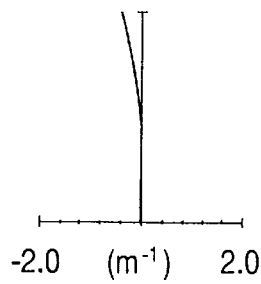
FIGS. 22A, 22B, and 22C are diagrams showing characteristics of spherical aberration, astigmatism. and distortion, respectively, at the moderate magnification position with the infinite object point of the optical system of the fifth embodiment.
Figure 22B:
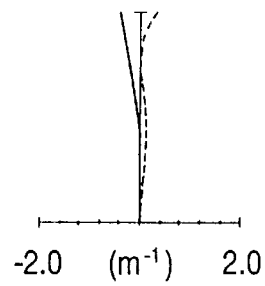
Figure 22C:
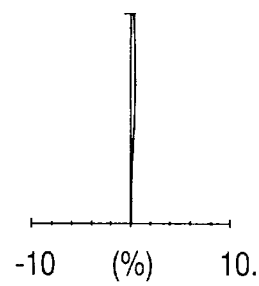
Figure 23A:
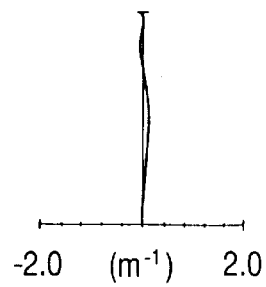
FIGS. 23A, 23B, and 23C are diagrams showing characteristics of spherical aberration, astigmatism. and distortion, respectively, at the high magnification position with the infinite object point of the optical system of the fifth embodiment.
Figure 23B:
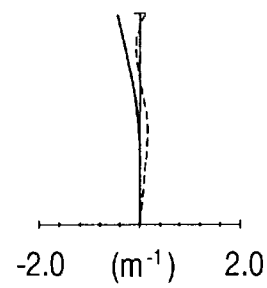
Figure 23C:
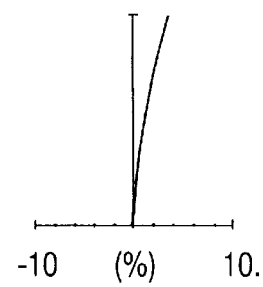

The finder of this embodiment, as shown in FIGS. 20A, 20B, and 20C, includes, in order from the object side, an objective system 71 composed of a first lens unit 71a having a negative refracting power, a second lens unit 71b having a positive refracting power, a third lens unit 71c having a positive refracting power, and a fourth lens unit 71d having a negative refracting power; and an eyepiece system 72 composed of a prism 72a as a reflecting member and an eyepiece 72b. A stop 73 is placed between the objective system 71 and the eyepiece system 72. An intermediate image plane produced by the objective system 71 is formed at the foremost surface of the prism 72a. The objective system 71 is such that when the magnification is changed, the second and fourth lens units 71b and 71d are fixed and the first and third lens units 71a and 71c are moved along the optical axis Lc. Further, a first reflecting surface 74a and a second reflecting surface 74b are arranged between the objective system 71 and the stop 73. The prism 72a has two reflecting surfaces. The first and second reflecting surfaces 74a and 74b and the prism 72a constitute an image erecting system. The first, second, third, and fourth lens units 71a, 71b, 71c, and 71d and the eyepiece system 72b are each constructed with a single lens. Reference numeral 75 denotes an eyepoint.

In the fifth embodiment, the first lens unit 71a is moved backward and then forward along the optical axis Lc as the magnification is decreased from the highest value, and thus when the objective system 71 has a focal length close to the intermediate focal length, the entire length of the objective system 71 is minimized. Since a combination of the first and second reflecting surfaces 74a and 74b forms a roof mirror and the prism 72a is constructed with a pentagonal prism, the height of the camera body can be kept to a minimum when the finder is incorporated in the camera.

The numerical data of optical members, such as lenses, constituting the Keplerian variable magnification finder of the fifth embodiment are shown below.

| | |
|---|---|
| Finder magnification | 0.40(low)~0.75(moderate)~1.40(high) |
| Field angle (2ω) | 50.4(low)~26.5(moderate)~13.9°(high) |
| Focal length $f_1 = -13.664$ | $f_3 = 13.098$ |
| $f_W = 8.402$ | $f_S = 15.718$    $f_T = 29.404$ |
| Variable magnification ration Z | 3.500 |
| Pupil diameter D | 4 mm |

$r_1 = -65.941$ (aspherical)
   $d_1 = 1.00$    $n_1 = 1.58423$    $\nu_1 = 30.49$
$r_2 = 7.081$ (aspherical)
   $d_2 = 7.547$ (low),
        0.800 (moderate),
        4.239 (high)
$r_3 = 9.064$ (aspherical)
   $d_3 = 2.50$    $n_3 = 1.49241$    $\nu_3 = 57.66$
$r_4 = 9.674$ (aspherical)
   $d_4 = 17.234$ (low),
        11.155 (moderate),
        1.098 (high)
$r_5 = 8.236$ (aspherical)
   $d_5 = 4.00$    $n_5 = 1.49241$    $\nu_5 = 57.66$
$r_6 = -24.974$ (aspherical)
   $d_6 = 4.049$ (low),
        10.127 (moderate),
        20.185 (high)
$r_7 = 45.607$ (aspherical)
   $d_7 = 1.00$    $n_7 = 1.58423$    $\nu_7 = 30.49$
$r_8 = -711.138$ (aspherical)
   $d_8 = 1.000$ (low),
        1.000 (moderate),
        1.000 (high)
$r_9 = 19.739$
   $d_9 = 43.50$    $n_9 = 1.52540$    $\nu_9 = 56.25$
$r_{10} = \infty$
   $d_{10} = 1.10$
$r_{11} = 15.244$ (aspherical)
   $d_{11} = 2.50$    $n_{11} = 1.49241$    $\nu_{11} = 57.66$
$r_{12} = -30.433$ (aspherical)
   $d_{12} = 17.00$
$r_{13}$ (eyepoint)

Conic constants and aspherical coefficients

First surface $\kappa = 0.9145$
$A4 = -2.3973 \times 10^{-3}$, $A6 = 8.5056 \times 10^{-5}$,
$A8 = -8.8648 \times 10^{-7}$
Second surface $\kappa = 0$
$A4 = -3.1663 \times 10^{-3}$, $A6 = 8.3921 \times 10^{-5}$,
$A8 = -3.1594 \times 10^{-7}$
Third surface $\kappa = 0$
$A4 = -5.0263 \times 10^{-4}$, $A6 = -2.2321 \times 10^{-5}$,
$A8 = 1.3188 \times 10^{-6}$
Fourth surface $\kappa = 0$
$A4 = -4.2522 \times 10^{-4}$, $A6 = -1.5294 \times 10^{-5}$,
$A8 = 9.6977 \times 10^{-7}$
Fifth surface $\kappa = 0$
$A4 = 6.4348 \times 10^{-5}$, $A6 = 1.1986 \times 10^{-5}$,
$A8 = 1.6060 \times 10^{-10}$
Sixth surface $\kappa = 0$
$A4 = 5.4606 \times 10^{-4}$, $A6 = 1.5594 \times 10^{-5}$,
$A8 = 3.3130 \times 10^{-7}$ -continued Seventh surface $\kappa = -0.1831$
$A4 = 2.1330 \times 10^{-3}$, $A6 = -5.5250 \times 10^{-5}$,
$A8 = 1.1904 \times 10^{-6}$
Eighth surface $\kappa = -0.2737$
$A4 = 2.3417 \times 10^{-3}$, $A6 = -5.6599 \times 10^{-5}$,
$A8 = 1.6429 \times 10^{-6}$
Eleventh surface $\kappa = 0.6944$
$A4 = 1.2675 \times 10^{-4}$
Twelfth surface $\kappa = 0.4573$
$A4 = 2.3271 \times 10^{-4}$ The values of Eqs. (1) and (2) in the Keplerian variable magnification finder of the fifth embodiment are as follows:

$|f1/(fS\ Z)|=0.25$ $f3/(fS\ Z)=0.24$

FIGS. 21A–21C, 22A–22C, and 23A–23C are aberration curve diagrams of the optical system in the fifth embodiment.

Also, although all optical members constituting the finder of each embodiment mentioned above are constructed of plastic, it is more desirable to use low hygroscopic materials which are not affected by humidity in the atmosphere. Further, each of the first to third lens units of the objective system in the finder of each embodiment is composed of a single lens, but even when this single lens is constructed with a cemented lens, the same effect can be secured.

In any of the embodiments mentioned above, the third lens unit is moved to thereby change the magnification and practically bears variable magnification behavior. Where the finder of the present invention is mounted in a camera, it is most effective for minimizing the thickness of the camera to fix the first lens unit of the finder. Although the image erecting system in the finder is composed of a combination of a roof mirror or prism with a pentagonal prism, it can easily be constructed even with Porro prisms. Such an arrangement brings about the same effect as in each embodiment.

In the numerical data of each embodiment, $r_1$, $r_2$, . . . represent radii of curvature of individual lenses or prism surfaces; $d_1$, $d_2$, . . . represent thicknesses of individual lenses or prisms, or spaces therebetween; $n_1$, $n_2$, . . . represent refractive indices of individual lenses; and $\nu_1$, $\nu_2$, . . . represent Abbe's numbers of individual lenses. Also, when Z is taken as the coordinates in the direction of the optical axis, Y as the coordinates in the direction normal to the optical axis, $\kappa$ as the conic constant, and A4, A6, and A8 as aspherical coefficients, the configurations of aspherical surfaces in each embodiment are expressed by the following equation:

$$Z = \frac{Y^2/r}{1+\sqrt{1-(1+\kappa)(Y/r)^2}} + A_4 Y^4 + A_6 Y^6 + A_8 Y^8$$

Figure 24:
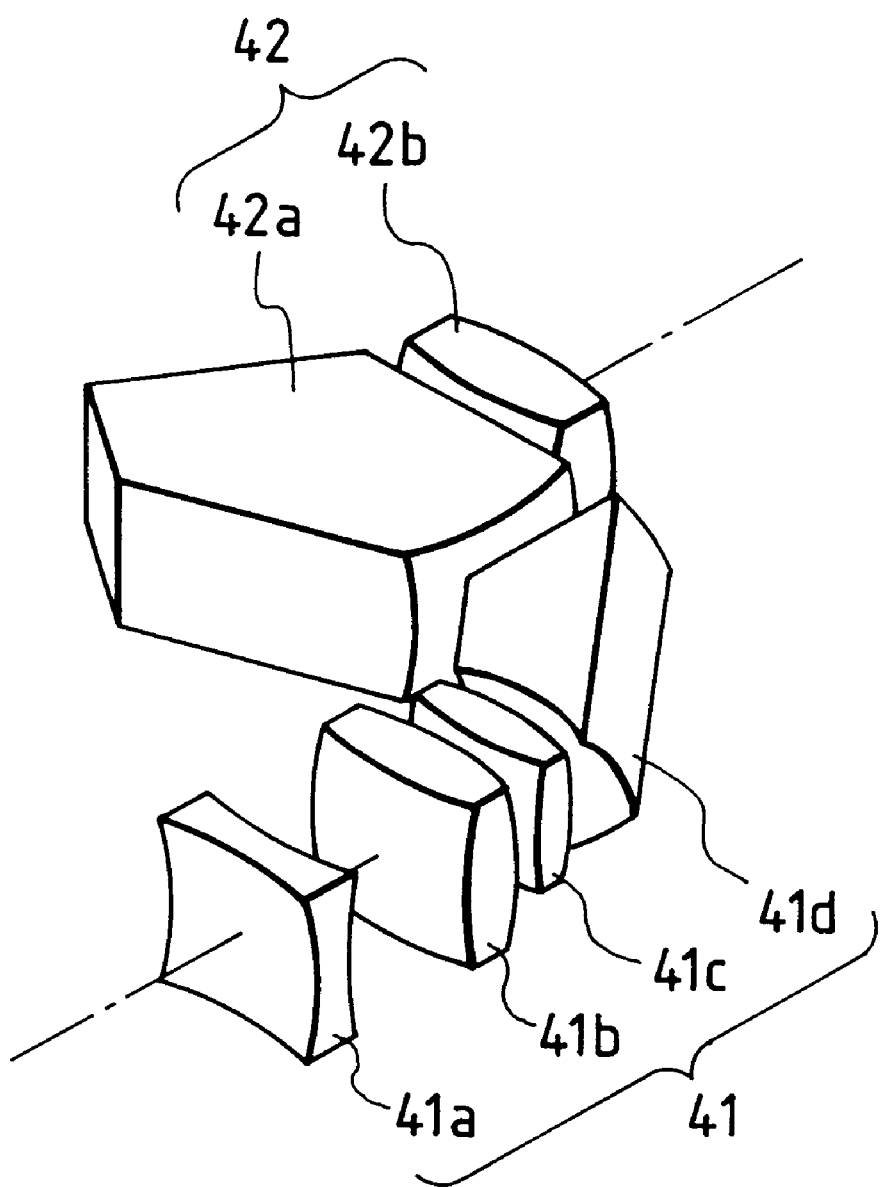
FIG. 24 is a view showing an actual arrangement, along the optical path, of lenses and prisms of the finder optical system shown in FIGS. 8A–8C.

Finally, FIG. 24 shows an actual arrangement, along the optical path, of lenses and prisms of the finder optical system shown in FIGS. 8A–8C. In the objective system 41, the first to third lens units 41a–41c are ordinary lenses, but the fourth lens unit 41d is a prism with a roof-type reflecting surface in which its entrance surface is configured as a concave to have a lens function. The pentagonal prism 42a has a convex entrance surface and is likewise provided with a lens function. The eyepiece 42b is an ordinary lens. The image is erected by the roof-type reflecting surface of the fourth lens unit 41d and two reflecting surfaces of the pentagonal prism 42a.

What is claimed is:

1. A Keplerian variable magnification finder comprising, in order from an object side:
    an objective system having a positive refracting power as a whole;
    an image erecting system for erecting an intermediate image formed by said objective system; and
    an eyepiece system having a positive refracting power as a whole,
        said objective system including, in order from the object side:
            a first lens unit having a negative refracting power;
            a second lens unit having a positive refracting power;
            a third lens unit having a positive refracting power; and
            a fourth lens unit having a negative refracting power,
            at least two lens units of respective lens units of said first lens unit, said second lens unit, said third lens unit, and said fourth lens unit being moved along an optical axis for a magnification change of said finder, and
            said objective system satisfying the following conditions at the same time:

$0.1 < |f1|/(fS\ Z) < 0.3$ $0.1 < f3/(fS\ Z) < 0.3$ where f1 is a focal length of said first lens unit, f3 is a focal length of said third lens unit, fS is an intermediate focal length of said objective system, where $fS = (fWfT)^{1/2}$ when focal lengths of said objective system at low and high magnification positions are represented by fW and fT, respectively, and Z is a variable magnification ratio, where $Z = f_T/f_W$.

2. A Keplerian variable magnification finder according to claim 1, wherein said third lens unit is moved along the optical axis when the magnification change is made.

3. A Keplerian variable magnification finder according to claim 2, wherein said first lens unit is fixed when the magnification change is made.

4. A Keplerian variable magnification finder according to claim 3, wherein each of said respective lens units is constructed with a single lens.

5. A Keplerian variable magnification finder according to claim 1, wherein said fourth lens unit includes a prism having reflecting surfaces.

6. A Keplerian variable magnification finder according to claim 5, wherein each of said respective lens units is constructed with a single lens.

7. A Keplerian variable magnification finder according to claim 1, wherein when the magnification change is made, said second lens unit and said third lens unit are moved along the optical axis and said first lens unit and said fourth lens unit are fixed.

8. A Keplerian variable magnification finder according to claim 7, wherein each of said respective lens units is constructed with a single lens.

9. A Keplerian variable magnification finder according to claim 1, wherein when the magnification change is made, said first lens unit and said third lens unit are moved and said second lens unit and said fourth lens unit are fixed.

10. A Keplerian variable magnification finder according to claim 9, wherein each of said respective lens units is constructed with a single lens.

* * * * *

UNITED STATES PATENT AND TRADEMARK OFFICE
CERTIFICATE OF CORRECTION

PATENT NO. : 5,920,427
DATED : July 6, 1999
INVENTOR(S) : Yasuzi Ogata

It is certified that error appears in the above-identified patent and that said Letters Patent is hereby corrected as shown below:

Column 15, line 11, change "$r_1 = -65.941$" to --$r_1 = 65.941$--.

Signed and Sealed this

Sixth Day of March, 2001

Attest:

NICHOLAS P. GODICI

*Attesting Officer*     Acting Director of the United States Patent and Trademark Office